US008486473B2

(12) United States Patent
Sarir et al.

(10) Patent No.: US 8,486,473 B2
(45) **Date of Patent: *Jul. 16, 2013**

(54) COMPOSITIONS AND PROCESSES FOR IMPROVING PHOSPHATATION CLARIFICATION OF SUGAR LIQUORS AND SYRUPS

(75) Inventors: Emmanuel M. Sarir, Los Angeles, CA (US); James Bushong, Collegeville, PA (US)

(73) Assignee: Carbo-UA Limited, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,078

(22) Filed: Nov. 9, 2010

(65) Prior Publication Data

US 2011/0165302 A1 Jul. 7, 2011

Related U.S. Application Data

(60) Provisional application No. 61/260,175, filed on Nov. 11, 2009.

(51) Int. Cl.
*A23L 1/22* (2006.01)

(52) U.S. Cl.
USPC .......... 426/533

(58) Field of Classification Search
None
See application file for complete search history.

(56) References Cited

U.S. PATENT DOCUMENTS

| | | | | |
|---|---|---|---|---|
| 1,646,079 A | | 10/1927 | Battelle | |
| 1,788,466 A | | 1/1931 | Lourens | |
| 1,815,276 A | | 7/1931 | Schwieger | |
| 2,067,362 A | | 1/1937 | Von Stietz | |
| 2,104,959 A | | 1/1938 | von Stietz | |
| 2,170,601 A | | 8/1939 | Wilson et al. | |
| 2,249,920 A | | 7/1941 | Taussig et al. | |
| 2,261,920 A | | 11/1941 | Graff et al. | |
| 2,430,262 A | * | 11/1947 | Vincent | 127/46.1 |
| 2,672,428 A | * | 3/1954 | Sklar | 127/46.1 |
| 2,829,986 A | | 4/1958 | Ehrhart | |
| 2,977,253 A | | 3/1961 | Grandadam et al. | |
| 3,097,114 A | | 7/1963 | Assalini | |
| 3,166,442 A | | 1/1965 | Duke | |
| 3,248,264 A | | 4/1966 | Welch | |
| 3,420,709 A | | 1/1969 | Barrett, Jr. et al. | |
| 3,539,393 A | * | 11/1970 | Remsen et al. | 127/51 |
| 3,698,951 A | | 10/1972 | Bennett | |
| 3,806,364 A | * | 4/1974 | Gasco | 127/48 |
| 3,853,616 A | | 12/1974 | Rundell et al. | |
| 3,909,287 A | | 9/1975 | Rundell et al. | |
| 3,973,986 A | | 8/1976 | Schoenrock et al. | |
| 4,101,338 A | | 7/1978 | Rapaport et al. | |
| 4,196,017 A | | 4/1980 | Melville et al. | |
| 4,247,340 A | | 1/1981 | Cartier | |
| 4,382,823 A | | 5/1983 | Gudnason | |
| 4,478,645 A | | 10/1984 | Gudnason | |
| 4,502,890 A | | 3/1985 | Urbanic | |
| 5,262,328 A | | 11/1993 | Clarke et al. | |
| 5,281,279 A | | 1/1994 | Gil et al. | |
| 5,865,899 A | | 2/1999 | Theoleyre et al. | |
| 5,891,254 A | | 4/1999 | Coville et al. | |
| 5,932,016 A | | 8/1999 | Paananen et al. | |
| 6,146,465 A | | 11/2000 | Xavier et al. | |
| 6,159,302 A | * | 12/2000 | Xavier et al. | 127/57 |
| 6,368,413 B1 | | 4/2002 | Charlet et al. | |
| 6,375,751 B2 | | 4/2002 | Reisig et al. | |
| 2001/0001178 A1 | | 5/2001 | Donovan et al. | |
| 2002/0011246 A1 | | 1/2002 | Reisig et al. | |
| 2005/0229813 A1 | | 10/2005 | Dionisi et al. | |
| 2009/0050135 A1 | | 2/2009 | Zschau et al. | |

FOREIGN PATENT DOCUMENTS

| | | |
|---|---|---|
| CN | 1609234 A | 4/2005 |
| CN | 101003842 A | 7/2007 |

OTHER PUBLICATIONS

Abdel-Razig et al., Effect of Addition of Separan at Different Concentrations as a Flocculants on Quality of Sugar Cane Juice, International Journal of Biological and Life Sciences, 2010, pp. 88-91, vol. 6, No. 2.

International Search Report of PCT/US10/56381 dated Feb. 28, 2011.

Cane Sugar Handbook, 12th. Ed., pp. 454-455.

Cane Sugar Handbook, 12th Ed., pp. 463-464.

Cane Sugar Handbook, 12th Ed., p. 634.

International Preliminary Examination Report of International Application No. PCT/US10/56380 dated Dec. 6, 2011.

U.S. Appl. No. 12/893,514 Office Action dated Sep. 27, 2011.

(Continued)

*Primary Examiner* — Melvin C Mayes

*Assistant Examiner* — Stefanie Cohen

(74) *Attorney, Agent, or Firm* — Venable LLP; Keith G. Haddaway; Robert Kinberg

(57) ABSTRACT

A process for improving phosphatation clarification of sugars can include adding to a sugar liquor a composition having at least one particulate sulfur reagent and at least one or more other particulate solids selected from, a particulate phosphorous reagent, a particulate carbonaceous reagent, a particulate aluminum reagent, a particulate filter aid, and a particulate ammonium reagent. The composition can be added to the phosphatation chemical reaction tank or prior to the phosphatation chemical reaction tank. Phosphatation chemicals, for example polymer decolorant, phosphoric acid, lime and a flocculent, can be added into the process at least five minutes after adding the composition. In using the process, the amount of phosphatation chemicals added is less than the amount of phosphatation chemicals required in the absence of addition of the composition or the purity of the sugar is improved as measured by one or more of color, turbidity and ash.

24 Claims, No Drawings

OTHER PUBLICATIONS

International Preliminary Report on Patentability issued in Application No. PCT/US2010/051501 dated May 15, 2012.
International Search Report issued in Application No. PCT/US2010/051501 dated Nov. 30, 2010.
International Search Report issued in Application No. PCT/US2010/05638 dated Jan. 13, 2011.
International Search Report issued in Application No. PCT/US2010/061728 dated Feb. 24, 2011.
Office Action issued in U.S. Appl. No. 12/893,514 dated Jul. 26, 2012.
Office Action issued in U.S. Appl. No. 12/942,082 dated Jun. 14, 2012.
Restrictions Requirement issued in Application No. 12/970,387 dated Mar. 8, 2012.
Written Opinion of the International Searching Authority issued in Application No. PCT/US2010/056381 dated Feb. 28, 2011.
Written Opinion of the International Searching Authority issued in Application No. PCT/US2010/061728 dated Feb. 24, 2011.
"Review of Proven Technologies Available for the Reduction of Raw Sugar Color" Proc S Afr Technol Assoc. (2008) 81, 165-183. Mando et al.
Office Action issued in Chinese Application 201080061053.4 dated Apr. 17, 2013, with English Translation.
English Translation of Abstracts of Documents BA and BB.

* cited by examiner

COMPOSITIONS AND PROCESSES FOR IMPROVING PHOSPHATATION CLARIFICATION OF SUGAR LIQUORS AND SYRUPS

BACKGROUND OF THE INVENTION

1. Field of the Invention

The present invention relates generally to compositions and methods for improving the phosphatation clarification of sugar liquors and syrups.

2. Related Art

Industry standards in the clarification of sugar liquors and syrups include a phosphatation or carbonatation process (Cane Sugar Handbook, $12^{th}$. Ed., pgs. 454-455). In the phosphatation clarification process, lime and phosphoric acid are added to the sugar liquors or syrups to form a calcium phosphate floc. The formation of the floc entraps impurities within and around the floc matrix, and air is sparged into the liquor or syrup to float the flocs and the impurities removed therein. A floating scum, containing the flocs and entrapped impurities, is formed at the top of the clarifier tank. The scum is removed from the top of the clarifier tank, and the purified liquor or syrup is taken from the bottom portion of the clarifier tank. Polymer flocculants and coagulants, such as those exemplified by polyacrylamide flocculants and quaternary ammonium coagulants, may be beneficially added to enhance the phosphatation process (Cane Sugar Handbook, $12^{th}$. Ed., pgs. 454-455). Additional clarity may be imparted to the sugar liquor and syrups after the phosphatation clarification; this can be achieved with deep-bed sand filtration and/or additional decolorization processes such as treating the clarified liquor with powder activated carbon (PAC) and diatomaceous earth (DE) filtration, or passing the clarified liquor through Granular Activated Carbon (GAC) or Ion-Exchange Resin (IER) columns.

Recent processes for sugar liquor and syrup clarification include those exemplified by U.S. Pat. No. 5,281,279 to Gil et al. This patent describes a process for producing refined sugar from raw sugar juices by treating raw sugar juice with a flocculent that can be lime, a source of phosphate ions, polyelectrolyte, and combinations thereof. The treated raw juice is concentrated by evaporation to form a syrup, with a subsequent treatment by flocculent, then filtered, then decolorized and de-ashed using ion-exchange resin.

In U.S. Pat. No. 4,247,340, Cartier claims a process for purifying impure sugar solutions, including simultaneous decolorization and clarification, comprising contacting the impure sugar solutions with submicroscopic ion-exchange resin in the forms of approximately spherical beads having diameters from about 0.01 to 1.5 microns, followed by separation of the ion-exchange resin from the sugar solution. The ion-exchange resin particles may be separated in the form of a floc formed either from impurities in the impure sugar solution, or by adding sufficient flocculating agent in the sugar solution to flocculate all of the resin particles.

Another example of sugar clarification for sugar bearing juices and related products includes that described in U.S. Pat. No. 5,262,328 to Clarke et al. The composition is a dry, powdered admixture of aluminum chloride hydroxide, lime, and activated bentonite. The composition may also include a polymer flocculating agent, such as a polyacrylamide.

SUMMARY OF THE INVENTION

In light of the information described above, it is the present invention provides new compositions and processes which result in an improved phosphatation clarification of sugar liquors and syrups. The improved process can involve adding compositions either directly to the phosphatation chemical reaction tank (where the traditional phosphatation chemicals are added), or at some stage prior to the phosphatation chemical reaction tank such as in the sugar melting station. The compositions can also be added at any point in the sugar purification process. The compositions provided in this invention are mixed intimately into the sugar liquors or syrups, and allowed to react so as to impart an improvement in some characteristic of the clarified liquor obtained therefrom, for example when the sugar liquors or syrups also react with the chemicals normally added in the phosphatation process.

The process can include adding to a sugar liquor a composition having at least one particulate sulfur reagent and at least one or more other particulate solids selected from, a particulate phosphorous reagent, a silica reagent, a particulate carbonaceous reagent, a particulate aluminum reagent, a particulate filter aid, and a particulate ammonium reagent. The particulate sulfur reagent is a compound with a formula that includes at least one sulfur atom and at least three oxygen atoms. The particulate phosphorous reagent is a compound that includes at least one phosphorous atom and at least three oxygen atoms in the chemical formula. The particulate aluminum reagent is a compound that includes at least one aluminum atom and at least three oxygen atoms in the chemical formula. The particulate ammonium reagent is a compound having at least one ammonium group ($NH_4$) in the chemical formula. Exemplary particulate filter aids include diatomaceous earth and perlite. In embodiments, the composition can include a particulate phosphorous reagent and a silica reagent, a particulate aluminum reagent and/or a particulate carbonaceous reagent. The composition is added to the phosphatation chemical reaction tank or prior to the phosphatation chemical reaction tank. In some embodiments, the process includes adding a composition containing at least one particulate sulfur reagent to the phosphatation chemical reaction tank or prior to the phosphatation chemical reaction tank.

In exemplary processes, phosphatation chemicals are added into the process at least five minutes after adding the composition. The phosphatation chemicals can be, for example, a polymer decolorant, phosphoric acid, lime and a flocculent. Components of the composition can be added individually to the sugar liquor, or two or more components of the composition can be mixed before adding to the sugar liquor. In using the process, the amount of phosphatation chemicals added may be less than the amount of phosphatation chemicals required in the absence of addition of the composition, or the purity of the sugar may be improved as measured by one or more of color, turbidity and ash.

An exemplary composition for use in the process include from about 55% to about 85% of the particulate sulfur reagent, from about 15% to about 35% of the particulate phosphorous reagent, and from about 0.5% to about 15% of the silica reagent. An exemplary composition can include from about 55% to about 75% of the particulate sulfur reagent, from about 5% to about 25% of the particulate phosphorous reagent, from about 2% to about 20% of the carbonaceous reagent, from about 0.5% to about 15% of the particulate aluminum reagent, and from about 0.5% to about 10% of the a silica reagent.

Compositions for use in the process of the invention can include at least one particulate sulfur reagent and one or more other particulate solids selected from a silica reagent, a particulate phosphorous reagent, a particulate carbonaceous reagent, a particulate aluminum reagent, a particulate filter aid selected from diatomaceous earth or perlite, and a particulate ammonium reagent. Exemplary compositions include a particulate sulfur reagent, a particulate phosphorous reagent and a silica reagent. Exemplary embodiments can also include a particulate aluminum reagent and a carbonaceous reagent. Exemplary embodiments can include a particulate ammonium reagent. In embodiments, the ratio of the particulate sulfur reagent to the particulate phosphorous reagent can be from about 1:1 to about 5:1 or from about 3:1 to about 4:1. Exemplary compositions can include from about 55% to about 85% of the particulate sulfur reagent, from about 15% to about 35% of the particulate phosphorous reagent, and from about 0.5% to about 15% of the silica reagent or from about 55% to about 75% of the particulate sulfur reagent, from about 5% to about 25% of the particulate phosphorous reagent, from about 2% to about 20% of the carbonaceous reagent, from about 0.5% to about 15% of the particulate aluminum reagent, and from about 0.5% to about 10% of the silica reagent.

The present invention provides advantages over existing methodologies that have not been previously realized. The invention can enable increased capacity and throughput in the sugar refining process. This can allow for an increased production per unit time or a decrease in the time required for producing the same amount of sugar. The compositions and process of the present invention also provide a more highly refined sugar following the clarification process. This can reduce or eliminate the need for additional downstream processes such as ion exchange resin or activated carbon decolorization. Eliminating or reducing the need for downstream processes can reduce refining time, reduce costs for chemicals and provide savings by reducing the need for chemical disposal. Refined crystal sugars produced using compositions and methods according to the present invention usually show less turbidity, less sediment, less ash, and less color.

Further novel features and other objects of the present invention will become apparent from the following detailed description, discussion and the appended claims.

DETAILED DESCRIPTION OF EMBODIMENTS

Although specific embodiments of the present invention will now be described, it should be understood that such embodiments are by way of example only and merely illustrative of but a small number of the many possible specific embodiments which can represent applications of the principles of the present invention. Changes and modifications by persons skilled in the art to which the present invention pertains are within the spirit, scope and contemplation of the present invention as further defined in the appended claims. All references cited herein are incorporated by reference as if each had been individually incorporated.

The present process involves adding compositions either directly to the phosphatation chemical reaction tank (wherein the traditional phosphatation chemicals are added), or at some stage prior to the phosphatation chemical reaction tank such as the sugar melting station, although as described further below, the composition may be added at other stages of the refining process. In exemplary embodiments, compositions according to the invention are added in conjunction with ingredients typically added during a traditional phosphatation process. However, use of the present compositions provides improved clarification while at the same time possibly allowing for a reduction in the amounts of traditional phosphatation reagents used during clarification. In some exemplary embodiments, the compositions of the invention are added prior to the phosphatation step. For example, the compositions can be added to be in contact with the sugar liquor for at least about 5 minutes before the traditional phosphatation treatment, at least about 10 minutes before the traditional phosphatation treatment, at least about 15 minutes before phosphatation treatment at least about 20 minutes before phosphatation treatment, or at least about 30 minutes before phosphatation treatment. The phosphatation treatment can occur in a phosphatation chemical reaction tank.

Phosphatation can include treatment with reagents typically used in phosphatation processes at any concentration in any quantity. However, the present invention can provide improved results even when reduced quantities of phosphatation chemicals are used. For example, in processes that utilize a mixture of a polymer decolorant, phosphoric acid a flocculent and hydrated lime, the amount of one or more reagents or the total amount of reagents can be reduced to less than about 90% of the amount normally utilized, to less than about 75% of the amount normally utilized, to less than about 60% of the amount normally utilized, or to less than about 50% of the amount normally utilized. For example, the amount of polymer decolorant can be reduced to about 20% to about 80% of the amount otherwise needed, the amount of phosphoric acid can be reduced to about 30% to about 80% of the amount otherwise needed, and the amount of hydrated lime can be reduced to about 60% to about 90% of the amount otherwise needed.

Alternatively, the compositions can be added at any point in the sugar purification process. The compositions are mixed intimately into the sugar liquors or syrups, and the sugar liquors or syrups allowed to react with the added composition so as to impart an improvement in some characteristic of the clarified liquor obtained therefrom.

The term “sugar liquor” or “sugar syrup” as used herein refers to any liquor or syrup containing a sugar. In exemplary embodiments, the sugar is derived from a plant source, such as, for example, corn, cane or beets. Examples of sugar liquors and/or syrups include solutions of cane or beet sugar liquors or syrups, starch hydrolyzate derived sweeteners such as high-fructose corn syrup and glucose, or others that are used in the art.

Several compositions can be used in the phosphatation process according to the present invention. In general, the compositions can include one or more components selected from a particulate sulfur reagent, a particulate phosphorous reagent, a particulate aluminum reagent, a silica reagent, a carbonaceous reagent, a particulate filter aid, a particulate ammonium reagent, and a polymer decolorant. Some of the components of the present compositions have been previously utilized in the sugar refining process. However, in general, these materials are traditionally used in downstream processes, i.e. after clarification by phosphatation. It has been found that treatment with the present compositions prior to or as part of the phosphatation process provides superior results and unexpected advantages over existing phosphatation processes.

The particulate sulfur reagent is a particulate solid that includes at least one sulfur atom and at least three oxygen atoms in the chemical formula. For example, the particulate sulfur reagent can be a compound or compound including an ion having the general formula $S_yO_x$ where y is generally 1-2, and $x \geqq 2.0y$. In exemplary particulate sulfur reagents, when y=1, x is 3 or more, and when y=2, x=4 or more. Examples of sulfur reagents include sulfite ($SO_3^{2-}$) salts, bisulfite ($HSO_3^-$) salts, sulfate ($SO_4^{2-}$) salts, hydrogen sulfate ($HSO_4^-$) salts, metabisulfite ($S_2O_5^{-2}$) salts, hydrosulfite ($S_2O_4^{-2}$) salts, and others. Specific examples include sodium sulfite, sodium bisulfite, sodium metabisulfite, sodium sulfate, sodium bisulfate, and sodium hydrosulfite (sodium dithionite). Persons skilled in the art will recognize additional compounds that are suitable particulate sulfur reagents.

The particulate phosphorous reagent is a particulate solid that includes at least one phosphorous atom and at least three oxygen atoms in the chemical formula. For example, the particulate phosphorous reagent can be a compound or compound including an ion having the general formula $P_yO_x$ compound where y is generally 1-2, and x≧2.0y. In exemplary particulate phosphorous reagents, when y=1, x is 3 or more, and when y=2, x=4 or more. Examples of phosphorous reagents include hydrogen phosphite ($HPO_3^{2-}$) compounds, monobasic phosphate ($H_2PO_4^{1-}$) compounds, dibasic phosphate compounds ($HPO_4^{2-}$), acid pyrophosphate ($H_2P_2O_7^{2-}$) compounds, and metaphosphate ($PO_3$) compounds. Specific examples include sodium hydrogen phosphite ($Na_2HPO_3$), ammonium hydrogen phosphite, ($(NH_4)_2HPO_3$), sodium phosphate monobasic ($NaH_2PO_4$), calcium phosphate monobasic ($Ca(H_2PO_4)_2$), ammonium phosphate monobasic ($NH_4H_2PO_4$), sodium phosphate dibasic ($Na_2HPO_4$), ammonium phosphate dibasic ($(NH_4)_2H_2PO_4$), and sodium acid pyrophosphate ($Na_2H_2P_2O_7$). Persons skilled in the art will recognize additional compounds that are suitable particulate phosphorous reagents.

The particulate aluminum reagent is a particulate solid selected from a group of aluminum compounds comprising of at least one aluminum atom and at least three oxygen atoms in the chemical formula. Specific examples include aluminum ammonium sulfate ($AlNH_4(SO_4)_2$), aluminum hydroxychloride ($Al_2(OH)_5Cl$), aluminum oxide ($Al_2O_3$), aluminum potassium sulfate ($AlK(SO_4)_2$), aluminum sodium sulfate ($AlNa(SO_4)_2$), aluminum sulfate ($Al_2(SO_4)_3$), and various permutations of compounds frequently referred to as polyaluminum chlorides or aluminum chlorohydrates that are designated by the general formula $(Al_nCl_{(3n-m)}(OH)_m$. Persons skilled in the art will recognize additional compounds that are suitable particulate aluminum reagents.

The term "polymer decolorant" as defined herein, refers to organic polymers that are frequently classified as a color precipitant for use in sugar solutions, and can typically be a liquid or waxy substance. Any polymer decolorant that can be used in sugar purification processing is acceptable, for example, those that contain a positive charge on a nitrogen atom. Exemplary polymer decolorants include dimethylamine-epichlorohydrin polymers such as Magnafloc LT-31, dimethyldialkylammonium chloride polymers such as Magnafloc LT-35 supplied by Ciba Chemicals, and dimethyl-di-tallow ammonium chloride. The polymer decolorant can be prepared as a diluted solution in water or other suitable solvent; unless otherwise indicated, the weight percent of the polymer decolorant of the mixture is defined herein as the weight percent of the polymer solution added to the mixture, regardless of whether the polymer solution is added in the "as-is commercially available state" (typically 30-50% solids content) or in a "further diluted state" with water or other suitable solvent. If the polymer decolorant is first diluted in water or other suitable solvent, it can be diluted from about 5 to 95% by weight of polymer in the "as-is commercially available state" with respect to the solvent, for example from about 10 to 80% by weight of polymer in the "as-is commercially available state", or from about 40 to 75% by weight of polymer in the "as-is commercially available state", with the balance comprising of water or other suitable solvent. In other examples, the commercially available polymer decolorant can be diluted with water in a ratio of from about 3:1 commercially available decolorant to water to about 1:3 commercially available decolorant to water. For example, polymer decolorant solutions can be prepared by adding about three parts of the commercially available reagent to about one part water, or about 2 parts of the commercially available reagent to about 1 part water, or about 1 part of the commercially available reagent to about 1 part of water, or about 1 part of the commercially available reagent to about 2 parts of water, or about 1 part of the commercially available reagent to about 3 parts of water. Aqueous solutions, for example a sugar solution of a solution containing one or more particulate reagents as described herein, can be used to dilute the commercially available polymer decolorant instead of pure water. Diluting the polymer decolorant from the "as-is commercially available state" can facilitate mixing of the polymer decolorant with various powders according to various embodiments of the present invention.

The silica reagent is a particulate solid that is classified as an amorphous silica or as an amorphous silicon dioxide (amorphous $SiO_2$). These silica reagents are sometimes also referred to as "precipitated silica." In embodiments, the silica reagent may be added as a sol gel.

The particulate carbonaceous reagent is a particulate solid that is classified as an activated carbon, and is interchangeably referred to herein as a particulate activated carbon. Any particulate activated carbon can be used; exemplary carbonaceous reagents include, for example, decolorizing activated carbons such as acid-activated decolorizing carbons. A particulate carbonaceous reagent can be any particulate carbonaceous reagent suitable for use in a sugar refining process. In exemplary embodiments, the particulate carbonaceous reagent can be in the range of, or have an average particle size in the range of, for example, from about 0.01 micron up to about 300 microns; from about 1 micron to about 300 microns; from about 5 microns to about 250 microns; or from about 50 microns to about 250 microns.

The particulate filter aid as used herein refers to any particulate solid that is generally classified as a filter aid. Any filter aid suitable for use in sugar purification processing can be used. Exemplary particulate filter aids include diatomaceous earth and perlite.

The particulate ammonium reagent is a particulate solid containing a source of ammonium ($NH_4$). Specific examples include ammonium bicarbonate ($NH_4HCO_3$), ammonium phosphate dibasic ($(NH_4)_2HPO_4$), ammonium sulfite ($(NH_4)_2SO_3$), ammonium hydrogen phosphite, ($(NH_4)_2HPO_3$), and ammonium phosphate monobasic ($NH_4H_2PO_4$). In some embodiments, the particulate ammonium reagent is a compound that provides a source of ammonium ($NH_4^+$) that obtains a pH in water solution greater than 7.0. Persons skilled in the art will recognize additional compounds that are suitable particulate ammonium reagents.

In exemplary embodiments, the particle size of the particulate components used in the composition can be in the range of, or have an average particle size in the range of, for example, from about 0.01 micron up to about 300 microns; from about 1 micron to about 300 microns; from about 30 microns to about 300 microns; or from about 50 microns to about 250 microns.

Compositions according to the invention can be added at some stage before the phosphatation chemical reaction tank, directly into the phosphatation chemical reaction tank as well as at any other point in the sugar purification process. Compositions containing multiple particulate solids as described herein can in some cases offer greater improvement in the process. The number of different additives and the amount of each can be varied to obtain the desired amount of clarification. The compositions can be added to the process as singular components, or they are first prepared as manufactured admixtures and added as a composite to the process. Compositions can also be added by admixing some components before addition and adding other components individually.

Examples of compositions that are useful in the present invention include:

Exemplary Embodiment (1)

At least one particulate sulfur reagent is added at the time of or prior to the phosphatation chemical reaction tank. Optionally, in addition to the sulfur reagent, the composition can include one or more of the particulate phosphorous reagent, particulate aluminum reagent, silica reagent, particulate carbonaceous reagent, particulate filter aid, and particulate ammonium reagent. In cases where an additional component is present, the sulfur reagent can be present in an amount of from about 1% to about 99% (by weight), for example from about 10 to 99%, or from about 20 to 97% of the composition.

Exemplary Embodiment (2)

A mixture containing at least one particulate sulfur reagent, and at least one particulate phosphorous reagent. In exemplary compositions according to this embodiment, the composition comprises from about 1% to about 99% of the sulfur reagent and from about 99% to about 1% of the phosphorous reagent. In other exemplary embodiments, the composition comprises from about 10% to about 90% of the sulfur reagent and from about 90% to about 10% of the phosphorous reagent. In still further exemplary embodiments, the composition comprises about 75% of the sulfur reagent and about 25% of the phosphorous reagent.

Exemplary Embodiment (3)

A mixture containing at least one particulate sulfur reagent, and at least one particulate aluminum reagent. In exemplary compositions according to this embodiment, the composition comprises from about 1% to about 99% of the sulfur reagent and from about 99% to about 1% of the aluminum reagent. In other exemplary embodiments, the composition comprises from about 10% to about 90% of the sulfur reagent and from about 90% to about 10% of the aluminum reagent. In still further exemplary embodiments, the composition comprises about 85% of the sulfur reagent and about 15% of the aluminum reagent.

Exemplary Embodiment (4)

A mixture containing at least one particulate sulfur reagent, and at least one silica reagent. In exemplary compositions according to this embodiment, the composition comprises from about 1% to about 99% of the sulfur reagent and from about 99% to about 1% of the silica reagent. In other exemplary embodiments, the composition comprises from about 5% to about 95% of the sulfur reagent and from about 95% to about 5% of the silica reagent. In still further exemplary embodiments, the composition comprises about 95% of the sulfur reagent and about 5% of the silica reagent.

Exemplary Embodiment (5)

A mixture containing at least one particulate sulfur reagent, and at least one particulate carbonaceous reagent. In exemplary compositions according to this embodiment, the composition comprises from about 1% to about 99% of the sulfur reagent and from about 99% to about 1% of the carbonaceous reagent. In other exemplary embodiments, the composition comprises from about 10% to about 90% of the sulfur reagent and from about 90% to about 10% of the carbonaceous reagent. In still further exemplary embodiments, the composition comprises about 90% of the sulfur reagent and about 10% of the carbonaceous reagent.

Exemplary Embodiment (6)

A mixture containing at least one particulate sulfur reagent, and at least one particulate filter aid. In exemplary compositions according to this embodiment, the composition comprises from about 1% to about 99% of the sulfur reagent and from about 99% to about 1% of the particulate filter aid. In other exemplary embodiments, the composition comprises from about 10% to about 90% of the sulfur reagent and from about 90% to about 10% of the particulate filter aid. In still further exemplary embodiments, the composition comprises about 75% of the sulfur reagent and about 25% of the particulate filter aid.

Exemplary Embodiment (7)

A mixture containing at least one particulate sulfur reagent, and at least one particulate ammonium reagent. In exemplary compositions according to this embodiment, the composition comprises from about 1% to about 99% of the sulfur reagent and from about 99% to about 1% of the particulate ammonium reagent. In other exemplary embodiments, the composition comprises from about 10% to about 90% of the sulfur reagent and from about 90% to about 10% of the particulate ammonium reagent. In still further exemplary embodiments, the composition comprises about 75% of the sulfur reagent and about 25% of the particulate ammonium reagent.

Exemplary Embodiment (8)

A combination of any of the Embodiments (1) through (7), either as tertiary component mixtures (for example, a combination of at least one particulate sulfur reagent, at least one particulate phosphorous reagent, and at least one silica reagent), or as quaternary component mixtures (for example, a combination of at least one particulate sulfur reagent, at least one particulate phosphorous reagent, at least one silica reagent, and at least one carbonaceous reagent), or as a five-component mixture (for example a combination of at least one particulate sulfur reagent, at least one particulate phosphorous reagent, at least one silica reagent, at least one carbonaceous reagent, and at least one aluminum reagent), or as a six-component mixture (for example a combination of at least one particulate sulfur reagent, at least one particulate phosphorous reagent, at least one silica reagent, at least carbonaceous reagent, at least one aluminum reagent, and at least one particulate filter aid), or as a seven-component mixture (for example a combination of at least one particulate sulfur reagent, at least one particulate phosphorous reagent, at least one silica reagent, at least one carbonaceous reagent, at least one aluminum reagent, at least one particulate filter aid, and at least one particulate ammonium reagent). In any of the compositions of this exemplary embodiment, the composition can comprise from about 1% to about 95% (by weight) of the sulfur reagent, or from about 10 to 90% of the sulfur reagent, or from about 50 to 85% of the sulfur reagent. These compositions can further comprise from about 0% to about 95% (by weight) of the phosphorous reagent, or from about 10 to 90% of the phosphorous reagent, or from about 10 to 30% of the phosphorous reagent. These compositions can further comprise from about 0% to about 95% (by weight) of the aluminum reagent, or from about 5 to 90% of the aluminum reagent, or from about 7 to 20% of the aluminum reagent. These compositions can further comprise from about 0% to about 95% (by weight) of the silica reagent, or from about 3 to 90% of the silica reagent, or from about 2 to 15% of the silica reagent. These compositions can further comprise from about 0% to about 95% (by weight) of the carbonaceous reagent, or from about 5 to 90% of the carbonaceous reagent, or from about 5 to 50% of the carbonaceous reagent. These compositions can further comprise from about 0% to about 95% (by weight) of the particulate filter aid, or from about 5 to 90% of the particulate filter aid, or from about 5 to 50% of the particulate filter aid. These compositions can further comprise from about 0% to 99% (by weight) of the particulate ammonium reagent, or from about 1 to 95% of the ammonium reagent, or from about 3 to 15% of the particulate ammonium reagent.

Exemplary Embodiment (9)

A mixture comprising of at least one particulate carbonaceous reagent, and at least one polymer decolorant. In exemplary compositions according to this embodiment, the composition comprises from about 50% to about 90% (by weight) of the carbonaceous reagent and from about 50% to about 10% (by weight) of the polymer decolorant. In other exemplary embodiments, the composition comprises from about 50% to about 75% of the carbonaceous reagent and from about 50% to about 25% of the polymer decolorant. In still further exemplary embodiments, the composition comprises from about 60% to about 70% of the carbonaceous reagent and from about 40% to about 30% of the polymer decolorant.

Exemplary Embodiment (10)

A mixture of at least one particulate activated carbon and at least one polymer decolorant, mixed with any combination of one or more of the particulate materials selected from the list of (1) a particulate sulfur reagent, (2) a silica reagent, (3) a particulate aluminum reagent, (4) a particulate phosphorous reagent, (5) a particulate filter aid, or (6) a particulate ammonium reagent. This embodiment would therefore include tertiary, quaternary, five-composite, six-composite, seven-component, and eight-component compositions. In any of these tertiary, quaternary, and five, six, seven, and eight component compositions, according to this embodiment, the composition comprises from about 10% to about 90% (by weight) of the carbonaceous reagent, or from about 20 to 75% of the carbonaceous reagent, or from about 30 to 70% of the carbonaceous reagent. These compositions can further comprise from about 5% to about 45% (by weight) of the polymer decolorant, or from about 10 to 40% of the polymer decolorant, or from about 20 to 40% of the polymer decolorant. These compositions can further comprise from about 0% to about 90% (by weight) of the sulfur reagent, or from about 3 to 75% of the sulfur reagent, or from about 3 to 60% of the sulfur reagent. These compositions can further comprise from about 0% to about 45% (by weight) of the phosphorous reagent, or from about 3 to 30% of the phosphorous reagent, or from about 3 to 20% of the phosphorous reagent. These compositions can further comprise from about 0% to about 45% (by weight) of the aluminum reagent, or from about 3 to 30% of the aluminum reagent, or from about 3 to 20% of the aluminum reagent. These compositions can further comprise from about 0% to about 45% (by weight) of the silica reagent, or from about 3 to 30% of the silica reagent, or from about 2 to 20% of the silica reagent. These compositions can further comprise from about 0% to about 50% (by weight) of the particulate filter aid, or from about 5 to 40% of the particulate filter aid, or from about 10 to 30% of the particulate filter aid. These compositions can further comprise from about 0% to about 45% (by weight) of the ammonium reagent, or from about 2 to 30% of the ammonium reagent, or from about 2 to 20% of the ammonium reagent.

Any combinations of the mixtures of components listed in Exemplary Embodiments (1) through (10) can be utilized in the process of the present invention.

The compositions of the invention can be added to the sugar liquor or syrup by way of a solids dosing method added directly to the sugar process (continuous or batch solids dosing using, e.g., a screw conveyor), or a liquid dosing method wherein the compositions are first added to water, sugar liquor, sugar syrup, or other suitable liquid, and pumped into the sugar process. As used herein, liquid includes slurries, suspensions and solutions. Other suitable means of adding a solid and/or a liquid can also be used. In some embodiments where both a solid and a liquid are added, some components can be added by solid dosing while others are added by pumping.

The compositions of the present invention can be added at any stage of the sugar purification process. In an exemplary embodiments, the compositions according to the invention are added directly to the phosphatation chemical reaction tank. In other exemplary embodiments, the compositions are added at a point in the process before the phosphatation chemical reaction tank. In still other embodiments, the compositions are added elsewhere in the process.

In some embodiments, the compositions have at least some contact time with the sugar liquor or syrup prior to entering the phosphatation chemical reaction tank. For example, the compositions can have at least about 3 minutes of contact time with the sugar liquor or syrup prior to entering the phosphatation chemical reaction tank, or at least about 5 minutes of contact time with the sugar liquor or syrup prior to entering the phosphatation chemical reaction tank. It can be beneficial to allow the inventive compositions to act at least partially on the sugar liquor or syrup prior to entering the phosphatation chemical reaction tank.

Use of compositions according to the invention and use of methods according to the invention can provide improvements to the phosphatation process. For example, practicing the invention can result in improved clarification of sugar liquors as measured by, for example, liquor color. For example, the color reduction can be improved by at least 10% (that is the color using the invention as measured in ICUMSA (IU) units is 90% of the value that would be obtained using traditional phosphatation processes), at least 15%, at least 25%, at least 30%, at least 40%, at least 50%, or even at least 60% or at least 65%. Further, use of the present invention can result in an improved removal of turbidity in the refined sugars. For example, practicing the invention can result in improved clarification of sugar liquors as measured by, for example, turbidity of the crystal sugar produced therefrom. For example, crystal sugar turbidity can be further reduced by at least 10% (that is the turbidity using the invention as measured on IU's is 90% of the value that would be obtained using traditional phosphatation processes), at least 20%, at least 30%, at least 40%, or at least 50%. Use of the present invention can also provide a reduction of ash in the refined sugar. For example, practicing the invention can result in improved clarification of sugar liquors as measured by, for example, ash in the crystal sugar produced therefrom. For example, crystal sugar ash can be reduced by at least 10% (percentage of ash in a refined sugar obtained using the invention is 90% of the value that would be obtained using traditional phosphatation processes), at least 15%, at least 20%, or at least 25%. Other parameters that measure sugar refining results can be similarly improved by use of the present invention.

Furthermore, use of compositions and processes according to the invention can provide the means for increases in refining productivity. Because the quality of refined sugar obtained using the invention is higher, a greater quantity of highly refined sugar can be produced. As a result, productivity can be increased by 2% or more, 5% or more, 10% or more, 15% or more or 20% or more.

Exemplary embodiments of the invention use a combination of a particulate sulfur reagent and a particulate phosphorous reagent. In such embodiments, the ratio of particulate sulfur reagent to particulate phosphorous reagent can range from about 1:1 to about 5:1, from about 2:1 to about 5:1, or from about 4:1 to about 3:1. Exemplary embodiments contain a particulate sulfur reagent and a particulate phosphorous reagent in a ratio of 4:1 or about 3:1. Other reagents can be added while maintaining the same ratio of particulate sulfur reagent to particulate phosphorous reagent. In another exemplary embodiment, the composition contains a silica reagent in addition to the particulate sulfur reagent and particulate phosphorous reagent. Other exemplary embodiments contain a silica reagent, a particulate sulfur reagent, a particulate phosphorous reagent, a particulate aluminum reagent and a carbonaceous reagent.

In an exemplary embodiment, a composition according to the invention includes a particulate sulfur reagent, a particulate phosphorous reagent, a carbonaceous reagent, a particulate aluminum reagent and a silica reagent. An exemplary particulate sulfur reagent is sodium metabisulfite, although other particulate sulfur reagents as described herein may also be used. An exemplary particulate phosphorous reagent is monosodium phosphate, although other particulate phosphorous reagents as described herein may also be used. An exemplary carbonaceous reagent is activated carbon, although other carbonaceous reagents as described herein may also be used. An exemplary particulate aluminum reagent is polyaluminum chloride, although other particulate aluminum reagents as described herein may also be used. An exemplary silica reagent is amorphous silica, although other particulate reagents as described herein may also be used.

An embodiment that includes a particulate sulfur reagent, a particulate phosphorous reagent, a carbonaceous reagent, a particulate aluminum reagent and a silica reagent can include, for example, from about 55% to about 75% of a particulate sulfur reagent; from about 60% to about 70% of a particulate sulfur reagent; or about 65% of a particulate sulfur reagent. Such an embodiment can include from about 2% to about 35% of a particulate phosphorous reagent; from about 5% to about 25% of a particulate phosphorous reagent; from about 10% to about 20% of a particulate phosphorous reagent; from about 2% to about 25% of a particulate phosphorous reagent; or about 15% of a particulate phosphorous reagent. Such an embodiment can include from about 2% to about 20% of a carbonaceous reagent; from about 5% to about 15% of a carbonaceous reagent; or about 10% of a carbonaceous reagent. Such an embodiment can include from about 0.5% to about 25% of a particulate aluminum reagent; from about 0.5% to about 15% of a particulate aluminum reagent; from about 0.5% to about 10% of a particulate aluminum reagent; from about 5% to about 10% of a particulate aluminum reagent; or about 6.5% of a particulate aluminum reagent. Such an embodiment can include from about 0.5% to about 15% of a silica reagent; from about 0.5% to about 10% of a silica reagent; from about 1% to about 5% of a silica reagent; or about 3.5% of a silica reagent.

As described herein, other materials can be added to this mixture, for example in the amounts added can be as shown in any of the embodiments described above. In embodiments, the final mixture can contain a particulate filter aid in an amount ranging from about 10% to about 50% of the total mixture, from about 15% to about 40% of the total mixture, from about 20% to about 40% of the total mixture, from about 20% to about 30% of the total mixture, or about 25% of the total mixture. The final mixture can contain a particulate ammonium reagent in an amount ranging from about 1% to about 40% of the total mixture, from about 15% to about 40% of the total mixture, from about 3% to about 30% of the total mixture, from about 20% to about 30% of the total mixture, or about 25% of the total mixture. The final mixture can contain a polymer decolorant in an amount ranging from about 5% to about 60% of the total mixture, from about 5% to about 50% of the total mixture, from about 2% to about 60% of the total mixture, from about 25% to about 50% of the total mixture from about 10% to about 45% of the total mixture, from about 20% to about 40% of the total mixture or from about 30% to about 40% of the total mixture.

An embodiment that includes a particulate sulfur reagent, a particulate phosphorous reagent, a carbonaceous reagent, a particulate aluminum reagent and a silica reagent can be used by contacting, i.e. combining, it with a sugar liquor prior to phosphatation of the sugar liquor. In exemplary embodiments, the composition is in contact with the sugar liquor for at least about 5 minutes before the traditional phosphatation treatment, at least about 10 minutes before phosphatation treatment, at least about 15 minutes before phosphatation treatment at least about 20 minutes before phosphatation treatment, or at least about 30 minutes before phosphatation treatment. The phosphatation treatment can occur in a phosphatation chemical reaction tank.

In another particular embodiment, a composition according to the invention includes a particulate sulfur reagent, a particulate phosphorous reagent, and a silica reagent. An exemplary particulate sulfur reagent is sodium metabisulfite, although other particulate sulfur reagents as described herein may also be used. An exemplary particulate phosphorous reagent is monosodium phosphate, although other particulate phosphorous reagents as described herein may also be used. An exemplary silica reagent is amorphous silica reagent, although other silica reagents as described herein may also be used.

An embodiment that includes a particulate sulfur reagent, a particulate phosphorous reagent, a silica reagent can include, for example, from about 55% to about 85% of a particulate sulfur reagent; from about 65% to about 75% of a particulate sulfur reagent; or about 70% of a particulate sulfur reagent. Such an embodiment can include from about 2% to about 35% of a particulate phosphorous reagent; from about 15% to about 35% of a particulate phosphorous reagent; from about 20% to about 30% of a particulate phosphorous reagent; from about 5% to about 30% of a particulate phosphorous reagent; or about 25% of a particulate phosphorous reagent. Such an embodiment can include from about 0.5% to about 20% of a silica reagent; from about 0.5% to about 15% of a silica reagent; from about 2% to about 15% of a silica reagent; from about 2% to about 10% of a silica reagent; from about 3 to about 5% of a silica reagent; or about 5% of a silica reagent.

As described herein, other materials can be added to this mixture, for example in the amounts added can be as shown in any of the embodiments described above. For example, the final mixture can contain a particulate aluminum reagent in an amount ranging from about 1% to about 25% of the total mixture, from about 5% to about 25% of the total mixture, from about 5% to about 20% of the total mixture, from about 10% to about 20% of the total mixture, about 10% of the total mixture, or about 15% of the total mixture. The final mixture can contain a particulate carbonaceous reagent in an amount ranging from about 3% to about 25% of the total mixture, from about 5% to about 15% of the total mixture, from about 5% to about 20% of the total mixture, from about 8% to about 12% of the total mixture, or about 10% of the total mixture. The final mixture can contain a particulate filter aid in an amount ranging from about 10% to about 50% of the total mixture, from about 15% to about 40% of the total mixture, from about 20% to about 40% of the total mixture, from about 20% to about 30% of the total mixture, or about 25% of the total mixture. The final mixture can contain a particulate ammonium reagent in an amount ranging from about 1% to about 40% of the total mixture, from about 15% to about 40% of the total mixture, from about 3% to about 30% of the total mixture, from about 20% to about 30% of the total mixture, or about 25% of the total mixture. The final mixture can contain a polymer decolorant in an amount ranging from about 5% to about 60% of the total mixture, from about 5% to about 50% of the total mixture, from about 2% to about 60% of the total mixture, from about 25% to about 50% of the total mixture from about 10% to about 45% of the total mixture, from about 20% to about 40% of the total mixture or from about 30% to about 40% of the total mixture.

EXAMPLES

The following non-limiting examples illustrate some compositions, usage methods, and advantages as described heretofore. The examples are illustrations of point only, and are not intended to limit the scope of our invention.

Example 1

A composition ("Composition #1") was prepared containing 64% sodium metabisulfite ($Na_2S_2O_5$), 16% monosodium phosphate ($NaH_2PO_4$), 10% powder activated carbon, 6.5% of particulate polyaluminum chloride, and 3.5% of amorphous silica. Composition #1 was added to the melt liquor at a sugar refinery, and contacted with the melted sugar liquor for approximately 30 minutes prior to the sugar reaching the phosphatation chemical reaction tank. The dosages of chemicals utilized with Composition #1 are compared to the traditional dosages of chemicals utilized in the process prior to the testing with Composition #1, in Table 1:

TABLE 1

Comparison of Chemical dosing in the Phosphatation Processes

| Process | Composition #1 | Polymer Decolorant | Phosphoric Acid | Polymer Floc-culent | Hydrated Lime |
|---|---|---|---|---|---|
| | (Dosage) | | | | |
| Traditional Process | 0 | 300 ppm | 450 ppm | 14 ppm | 540 ppm |
| Composition #1 Improved Phosphatation | 450 ppm | 125 ppm | 250 ppm | 14 ppm | 350 ppm |

As seen in Table 1, significant reductions of traditional phosphatation chemicals were achieved with the use of Composition #1 of the present invention.

The performance advantages of the process of the present invention, utilizing Composition #1 improved phosphatation process, are shown in Table 2:

TABLE 2

Performance Advantages Obtained with Composition #1 Compared to the Traditional Phosphatation Process

| Quality Parameter (IU Color) | Traditional Process Results | Process with Composition #1 |
|---|---|---|
| Clarified Liquor | 450 | 350 |
| Fine Liquor | 240 | 150 |
| R1 Sugar | 25 | 15 |
| R2 Sugar | 52 | 38 |
| R3 Sugar | 100 | 66 |
| R4 Sugar | not obtained | 112 |
| Composite Sugar (Fortified with Vitamin A) | 60 | 44 |
| Composite Sugar (Non-Fortified | 32 | 17 |

As seen in Table 2, the clarified liquor color improved to 350 IU color units, leading to an improvement in the final liquor. When crystallized to produce refined sugar, this final liquor quality produced sugars lower in color (as seen in R1-R4 sugar, and the composite R1-R4 sugars with and without fortification of Vitamin A). The quality of the refined sugar was clearly improved. Additionally, the traditional process resulted in the lowest-grade crystal sugar (R-4) to be excessively high in color to be considered refined sugar. Utilizing the improved phosphatation process incorporating Composition #1, the R-4 grade crystal was within specifications required to utilize it as refined sugar. The successful attainment of R-4 as a refined sugar increased the daily production yield by 2.1%. Composition #1 improved phosphatation process embodied in this invention was observed to increase the refined sugar quality as well as increase daily production efficiency.

Example 2

A composition ("Composition #2") was prepared containing 71.5% sodium metabisulfite ($Na_2S_2O_5$), 24% monosodium phosphate ($NaH_2PO_4$), and 4.5% of amorphous silica. Composition #2 was added to the melt liquor at a sugar refinery, and contacted with the melted sugar liquor for approximately 5 minutes prior to the sugar reaching the phosphatation chemical reaction tank. The dosages of chemicals utilized with Composition #2 are compared to the traditional dosages of chemicals utilized in the process prior to the testing with Composition #2, in Table 3:

TABLE 3

Comparison of Chemical Dosing in the Phosphatation Processes

| Process | Composition #2 | Polymer Decolorant | Phosphoric Acid | Polymer Floc-culent | Hydrated Lime |
|---|---|---|---|---|---|
| | (Dosage) | | | | |
| Traditional Process | 0 | 200 ppm | 300 ppm | 14 ppm | 350 ppm |
| Composition #2 Improved Phosphatation | 170 ppm | 70 ppm | 200 ppm | 14 ppm | 350 ppm |

The performance advantages of the process of the present invention, utilizing the Composition #2 improved phosphatation process, are shown in Table 4:

TABLE 4

Performance Advantages obtained with Composition #2, Compared to the Traditional Phosphatation Process

| Process Method | Clarified Liquor Color (IU) | Refined Sugar Turbidity (IU) | Refined Sugar Ash | Refined Sugar Floc Potential |
|---|---|---|---|---|
| Traditional Phosphatation | 158 | 12 | 0.004% | 0.019 |
| Composition #2 Improved Phosphatation | 109 | 9 | 0.003% | 0.014 |

As seen in Table 4, the quality of the clarified liquor was improved as measured by color. Additionally, the important refined sugar quality parameters of turbidity, ash, and floc potential were all improved when using Composition #2.

Example 3

Composition #2 was added to the melt liquor at another sugar refinery, and contacted with the melted sugar liquor for approximately 30 minutes prior to the sugar reaching the phosphatation chemical reaction tank. The performance advantages of the process of the present invention, utilizing Composition #2, are shown in Table 5.

TABLE 5

Performance Advantages obtained with Composition #2, Compared to the Traditional Phosphatation Process

| Process Method | Clarified Liquor Color (IU) | Daily Refined Sugar Produced (Tons) |
|---|---|---|
| Traditional Phosphatation | 400 | 450 |
| Composition #2 Improved Phosphatation | 180 | 530 |

As seen in Table 5, the quality of the clarified liquor was improved as measured by color. Additionally, the daily refined sugar produced increased substantially when utilizing Composition #2. The improvement in daily refined sugar production, was enabled due to the better quality clarified liquor quality (color) obtained in the improved process. For this refinery, the clarified liquor is the same as the final liquor that is crystallized (no other purification processes are located after the clarification). If the fine liquor color is too high, an excessive amount of the crystal sugar produced therefrom will be too high in color to be a refined grade quality. By lowering the clarified/fine liquor color, a substantial increase in daily refined sugar production was achieved with Composition #2 process embodied in this invention.

The present invention is not intended to be restricted to any particular form or arrangement, or any specific embodiment, or any specific use, as described herein. Modifications of various particulars or relations can be made without departing from the spirit or scope of the invention as claimed herein. Specific examples are presented for illustration and disclosure of an operative embodiment and not to show all of the various forms or modifications in which this invention might be embodied or operated. The present detailed description is not intended to limit the features or principles of the present invention in any way.

What is claimed is:

1. A process for use with phosphatation processing of sugar liquors, comprising adding to a sugar liquor a composition comprising at least one particulate sulfur reagent containing at least one sulfur atom and at least three oxygen atoms, a particulate phosphorous reagent containing at least one phosphorous atom and at least three oxygen atoms in the chemical formula, a particulate aluminum reagent containing at least one aluminum atom and at least three oxygen atoms in the chemical formula, a particulate carbonaceous reagent and a silica reagent; and optionally further comprising one or more other particulate solids selected from the group consisting of a particulate filter aid, and a particulate ammonium reagent having at least one ammonium group ($NH_4$) in the chemical formula.

2. A process for use with phosphatation processing of sugar liquors, comprising adding to a sugar liquor a composition comprising at least one particulate sulfur reagent containing at least one sulfur atom and at least three oxygen atoms a particulate aluminum reagent containing at least one aluminum atom and at least three oxygen atoms in the chemical formula and a particulate carbonaceous reagent; and optionally further comprising one or more other particulate solids selected from the group consisting of a silica reagent, a particulate phosphorous reagent containing at least one phosphorous atom and at least three oxygen atoms in the chemical formula, a particulate filter aid, and a particulate ammonium reagent having at least one ammonium group ($NH_4$) in the chemical formula.

3. The process of one of claim 1 or 2, wherein the composition is added to a phosphatation chemical reaction tank.

4. The process of one of claim 1 or 2, wherein the composition is added prior to a phosphatation chemical reaction tank.

5. The processes of any one of claim 1 or 2, wherein components of the composition are added individually to the sugar liquor.

6. The process of any one of claim 1 or 2, wherein two or more components of the composition are mixed before adding to the sugar liquor.

7. The process of any one of claim 1 or 2, wherein the amount of phosphatation chemicals added is less than the amount of phosphatation chemicals required in the absence of addition of the composition or the purity of the sugar is improved as measured by one or more of color, turbidity and ash.

8. The process of claim 2, wherein the composition comprises from about 55% to about 75% of the at least one particulate sulfur reagent, from about 5% to about 25% 90% of the particulate phosphorous reagent, from about 2% to about 20% of the carbonaceous reagent, from about 0.5% to about 15% of the particulate aluminum reagent, and from about 0.5% to about 10% of the a silica reagent.

9. The process of claim 2, wherein the composition comprises from about 55% to about 75% of the at least one particulate sulfur reagent, from about 5% to about 25% 90% of the particulate phosphorous reagent, from about 2% to about 20% of the carbonaceous reagent, from about 0.5% to about 15% of the particulate aluminum reagent, and from about 0.5% to about 10% of the a silica reagent.

10. A process for use with phosphatation processing of sugar liquors, comprising adding to a sugar liquor a composition comprising, from about 55% to about 85% of at least one particulate sulfur reagent containing at least one sulfur atom and at least three oxygen atoms, from about 15% to about 35% of a particulate phosphorous reagent containing at least one phosphorous atom and at least three oxygen atoms in the chemical formula, and from about 0.5% to about 15% of a silica reagent; and optionally further comprising a particulate carbonaceous reagent, a particulate aluminum reagent containing at least one aluminum atom and at least three oxygen atoms in the chemical formula, a particulate filter aid selected from diatomaceous earth or perlite, and a particulate ammonium reagent having at least one ammonium group ($NH_4$) in the chemical formula.

11. A composition for use in sugar refining phosphatation clarification, comprising at least one particulate sulfur reagent containing at least one sulfur atom and at least three oxygen atoms, a particulate phosphorous reagent containing at least one phosphorous atom and at least three oxygen atoms in the chemical formula, a particulate aluminum reagent containing at least one aluminum atom and at least three oxygen atoms in the chemical formula, a carbonaceous reagent and a silica reagent; and optionally further comprising one or more other particulate solids selected from the group consisting of a particulate filter aid, and a particulate ammonium reagent having at least one ammonium group ($NH_4$) in the chemical formula.

12. The composition of claim 11, wherein the ratio of the particulate sulfur reagent to the particulate phosphorous reagent is from about 1:1 to about 5:1.

13. The composition of claim 12, wherein the ratio of the particulate sulfur reagent to the particulate phosphorous reagent is from about 3:1 to about 4:1.

14. A composition for use in sugar refining phosphatation clarification, comprising at least one particulate sulfur reagent containing at least one sulfur atom and at least three oxygen atoms, a particulate aluminum reagent containing at least one aluminum atom and at least three oxygen atoms in the chemical formula, and a carbonaceous reagent; and optionally further comprising one or more other particulate solids selected from the group consisting of a silica reagent, a particulate phosphorous reagent containing at least one phosphorous atom and at least three oxygen atoms in the chemical formula, a particulate filter aid, and a particulate ammonium reagent having at least one ammonium group ($NH_4$) in the chemical formula.

15. A process for use with phosphatation processing of sugar liquors, comprising adding to a sugar liquor a composition comprising a composition according to one of claim 11 or 14, wherein the composition is added to a phosphatation chemical reaction tank or prior to a phosphatation chemical reaction tank.

16. The process of claim 15, further comprising adding phosphatation chemicals to the process at least five minutes after adding the composition.

17. The process of claim 16, wherein phosphatation comprises addition of a polymer decolorant, phosphoric acid, lime and a flocculent.

18. The process of claim 16, wherein the phosphatation chemicals are added to the process from about 10 to about 30 minutes after adding the composition.

19. The composition of one of claim 11 or 14, further comprising a particulate ammonium reagent.

20. The composition of claim 14, comprising from about 55% to about 75% of the at least one particulate sulfur reagent, from about 5% to about 25% of the particulate phosphorous reagent, from about 2% to about 20% of the carbonaceous reagent, from about 0.5% to about 15% of the particulate aluminum reagent, and from about 0.5% to about 10% of the silica reagent.

21. The composition of claim 14, comprising from about 55% to about 75% of the at least one particulate sulfur reagent, from about 5% to about 90% of the particulate phosphorous reagent, from about 2% to about 20% of the carbonaceous reagent, from about 0.5% to about 15% of the particulate aluminum reagent, and from about 0.5% to about 10% of the silica reagent.

22. A composition for use in sugar refining phosphatation clarification, comprising from about 55% to about 85% of at least one particulate sulfur reagent containing at least one sulfur atom and at least three oxygen atoms, from about 15% to about 35% of a particulate phosphorous reagent containing at least one phosphorous atom and at least three oxygen atoms in the chemical formula, and from about 0.5% to about 15% of a silica reagent; and optionally further comprising a particulate carbonaceous reagent, a particulate aluminum reagent containing at least one aluminum atom and at least three oxygen atoms in the chemical formula, a particulate filter aid selected from diatomaceous earth or perlite, and a particulate ammonium reagent having at least one ammonium group ($NH_4$) in the chemical formula.

23. A process for use with phosphatation processing of sugar liquors, comprising adding to a sugar liquor a composition comprising from about 55% to about 85% of at least one particulate sulfur reagent containing at least one sulfur atom and at least three oxygen atoms, from about 10% to about 90% of a particulate phosphorous reagent containing at least one phosphorous atom and at least three oxygen atoms in the chemical formula, and from about 0.5% to about 15% of a silica reagent; and optionally further comprising a particulate carbonaceous reagent, a particulate aluminum reagent containing at least one aluminum atom and at least three oxygen atoms in the chemical formula, a particulate filter aid selected from diatomaceous earth or perlite, and a particulate ammonium reagent having at least one ammonium group ($NH_4$) in the chemical formula.

24. A composition for use in sugar refining phosphatation clarification, comprising from about 55% to about 85% of at least one particulate sulfur reagent containing at least one sulfur atom and at least three oxygen atoms, from about 10% to about 90% of a particulate phosphorous reagent containing at least one phosphorous atom and at least three oxygen atoms in the chemical formula, and from about 0.5% to about 15% of a silica reagent; and optionally further comprising a particulate carbonaceous reagent, a particulate aluminum reagent containing at least one aluminum atom and at least three oxygen atoms in the chemical formula, a particulate filter aid selected from diatomaceous earth or perlite, and a particulate ammonium reagent having at least one ammonium group ($NH_4$) in the chemical formula.

* * * * *